United States Patent
Thompson

(10) Patent No.: US 6,217,453 B1
(45) Date of Patent: Apr. 17, 2001

(54) FLEXIBLE COUPLING AND BONDED SUBASSEMBLY HAVING A CENTRAL PIVOT BEARING

(75) Inventor: Scott K. Thompson, Erie, PA (US)

(73) Assignee: Lord Corporation, Cary, NC (US)

(*) Notice: Subject to any disclaimer, the term of this patent is extended or adjusted under 35 U.S.C. 154(b) by 0 days.

(21) Appl. No.: 09/232,925

(22) Filed: Jan. 19, 1999

(51) Int. Cl.⁷ .................................................. F16D 3/52
(52) U.S. Cl. ........................... 464/89; 464/82; 464/30; 446/75; 384/208
(58) Field of Search .................... 464/92, 30, 89, 464/147, 106, 87; 384/208; 440/75, 83

(56) References Cited

U.S. PATENT DOCUMENTS

| | | | |
|---|---|---|---|
| 3,531,949 | * 10/1970 | Downey | 464/147 |
| 4,041,730 | 8/1977 | Kress. | |
| 4,516,956 | 5/1985 | Staiert. | |
| 4,626,112 | 12/1986 | Kramer. | |
| 4,634,391 | 1/1987 | Entringer et al.. | |
| 4,642,057 | 2/1987 | Frazzell et al.. | |
| 4,734,081 | 3/1988 | Neathery et al.. | |
| 4,772,245 | 9/1988 | Readman et al.. | |
| 4,787,868 | 11/1988 | Hoshiba et al.. | |
| 4,813,898 | 3/1989 | Nakase et al.. | |
| 4,925,408 | 5/1990 | Webb et al.. | |
| 4,938,723 | * 7/1990 | Yoshimura et al. | 440/83 |
| 5,252,028 | 10/1993 | LoBosco et al.. | |
| 5,282,444 | 2/1994 | Ito et al.. | |
| 5,377,962 | * 1/1995 | Ochs et al. | 267/281 |
| 5,474,499 | 12/1995 | Olson. | |
| 5,558,456 | 9/1996 | Nakase et al.. | |
| 5,573,463 | * 11/1996 | Arlt | 464/147 |
| 5,637,041 | 6/1997 | Hameakers et al.. | |
| 5,720,638 | 2/1998 | Hale. | |

FOREIGN PATENT DOCUMENTS 39 06 201 A1    8/1990  (DE).

OTHER PUBLICATIONS

Lord Industrial Products, *Dynaflex® LCD Type Couplings*, PC–2201K, pp. 114–118, 121–122, Mar. 1989.

\* cited by examiner

Primary Examiner—Lynne H. Browne
Assistant Examiner—Aaron Dunwoody
(74) Attorney, Agent, or Firm—Michael M. Gnibus; Randall S. Wayland

(57) ABSTRACT

A coupling (20) having a driving member (22) with an inner surface (24), a driven member (26) having an outer surface (28), a flexible member (27) intervening between the surfaces (24, 28) exhibiting an elastic center (EC), and a pivot (32) cooperating between the members (22, 26) wherein an axial location of the pivot substantially coincides with the axial location of the elastic center (EC). In another aspect, a bonded Subassembly (34) is provided which, together with the driving member (22), forms the coupling (20). The subassembly (34) has a driven member (26) with first (40) and second (50) projecting portions extending from a main body portion (38). The first portion (40) has an outer surface (28) and the second portion (50) includes a bearing member. The flexible member (27) is bonded to the outer surface (28) and a third projection (42) extends from the main body portion (38). The axial location of the bearing member is substantially aligned axially with the position of the elastic center (EC). The coupling (20) find utility in drivelines for vehicles, such a personal watercraft.

23 Claims, 7 Drawing Sheets

FLEXIBLE COUPLING AND BONDED SUBASSEMBLY HAVING A CENTRAL PIVOT BEARING

FIELD OF THE INVENTION

The invention relates to torsional drive couplings. More particularly, the present invention is directed to a resilient torsional coupling including a resilient element.

BACKGROUND OF THE INVENTION

Flexible drive couplings are transmission devices that connect between a driving and driven member, such as in a drive train, to provide misalignment accommodation, torque carrying capability and appropriate stiffness for vibration isolation. Couplings are used, for example, in a drive train between an engine and a unit to be rotated, such as a jet drive unit in a personal watercraft or a propeller in a boat. The coupling's torsional stiffness is designed to minimize torsional vibrations that may cause damage to the drive train components. Moreover, such couplings, as taught in U.S. Pat. No. 4,516,956 to Staiert, and U.S. Pat. No. 4,041,730 to Kress may include a torque overload feature where the bonded member slips inside the housing after a limit torque is exceeded. This may occur, for example, when the driven component becomes jammed or when it strikes another object.

Further Prior Art couplings are shown in FIGS. 1 and 2. These coupling connect between a flywheel and a output shaft in a personal watercraft. Each coupling 10 includes a driving member 11, a driven member 12, and a elastomer member 13 positioned between them. The elastomer member 13 is bonded to the driven member 12 and is received in an interference fit (precompressed) and unbonded relationship in a pocket 14 formed in the driving member 11. The FIG. 1 Prior Art coupling includes a low cocking stiffness of about 14,400 lbf.-in./radian (1,627 N-m/radian). This low stiffness prevents any parallel or cocking misalignment between the members 11, 12 from being converted into large radial forces which are then transmitted through engine mounts into the hull liner (frame), and finally to the operator of the personal watercraft. However, the FIG. 1 coupling includes a low radial stiffness, about 56,200 lbf./in. (9,835 N/mm). Any rotational unbalance present will be aggravated at higher rotational frequencies because the unbalance tends to move further outward from the central axis because of the low radial spring rate. Moreover, the concentricity between the driving and driven member can be poor when a low radial stiffness is provided, thereby possibly further aggravating any unbalance present.

To combat the low radial stiffness, a pivot bearing 15 was added in the FIG. 2 Prior Art coupling. This substantially increased the radial stiffness to approximately 219,000 lbf./in. (38,352 N/m), thereby improving any unbalance problem present. However, the positioning of the pivot bearing 15 is offset from the elastomer member 13, therefore, any parallel or cocking misalignment between the members 11, 12 causes the elastomer member to be loaded in radial compression. This results in a much higher cocking stiffness (approximately 426,700 lbf.-in./radian (48,217 N-m/radian)) than compared in the FIG. 1 coupling, and, therefore, resultantly higher loads generated should any cocking or parallel misalignment be present. Moreover, because of the high cocking stiffness it may be necessary to shim various driveline components to minimized such cocking or parallel misalignment, thus increasing manufacturing costs.

Although, in general, these prior art couplings have adequate performance and/or durability, they each exhibit certain performance limitations. For example, the FIG. 1 embodiment exhibits low radial stiffness thereby, in some installations, this can lead to unwanted radial vibrations in the drive train due to rotational unbalances in, and concentricity between, the members 11, 12. In an effort to provide increased radial stiffness, a pivot bearing 15 was added in the FIG. 2 embodiment. However, this pivot bearing 15 limits the degree of cocking misalignment that is achievable by the coupling as well as substantially increases the cocking stiffness thereof.

Accordingly, there has been a long felt, and unmet need for a coupling capable of transmitting torques, which exhibits both increased radial stiffness as well as low cocking stiffness.

SUMMARY OF THE INVENTION

The present invention is a resilient coupling providing increased radial stiffness and at the same exhibiting a low cocking stiffness. Moreover, the coupling can accommodate substantial cocking and/or parallel misalignment. The coupling is most useful for transmitting torque, accommodating misalignment, and reducing vibration in the driveline components of personal watercraft.

According to the invention, the coupling comprises a driving member including an inner surface; a driven member including an outer surface; a flexible member intervening between the outer surface and the inner surface, the flexible member including an elastic center; and a pivot cooperating between the driving and driven members wherein an axial location of the pivot substantially coincides with an axial location of the elastic center.

According to another aspect of the invention, the coupling comprises a driving member including a bridging portion, an outer projection axially extending from said bridging portion, and an inner projection axially extending from said bridging portion and spaced radially inward from said outer projection, said outer projection including an inner surface and said inner projection including a first bearing member, a driven member including a main body portion including first and second projecting portions projecting axially therefrom, an outer surface formed on said first projecting portion and a second bearing member formed on said second projecting portion, a flexible member bonded to said outer surface of said driven member and received in a radially precompressed and unbonded relation with said inner surface, said elastomer member including an elastic center, and a pivot formed by said first and second bearing members, wherein an axial location of said pivot substantially coincides with said elastic center.

According to a further aspect of the invention, a coupling is provided comprising a first member including a generally hollow cylindrical outer projection having an inner surface, and an generally cylindrical inner projection concentric with said outer projection, said inner projection including a first bearing member, a second member including a generally cylindrical first projecting portion and a second projecting portion generally concentric with said first projecting portion, said first projecting portion including an outer surface and said second projecting portion including a second bearing member, an annular flexible member bonded to said outer surface and received in a radially precompressed and unbonded relation with said inner surface, said flexible member including an elastic center, and a pivot formed by said first and second bearing members, and wherein axial location of said pivot substantially coincides with an axial position of said elastic center.

In yet another aspect, a bonded subassembly is provided which is adapted to be received in the driving member of a coupling. The bonded subassembly comprises a driven member including first and second projecting portions extending in an axial direction from a main body portion of said driven member, said first projecting portion including an outer surface formed thereon, said second projecting portion including a bearing member formed on a radially outward surface thereof, a flexible member bonded to an outer surface, said flexible member including an elastic center (EC), a third projection which projects in a axial direction from a main body portion in a direction opposite from said projecting portions, and an axial location of said bearing member is substantially axially aligned with an axial position of said elastic center.

In accordance with another aspect, the invention comprises a vehicle, comprising a structure; an engine mounted to said structure; a drive component interconnected to and rotated by said engine; a coupling secured to said first drive component, said coupling including a driving member including an inner surface, a driven member including an outer surface, a flexible member intervening between said outer surface and said inner surface, said flexible member including an elastic center, and a pivot cooperating between said driving and said driven members wherein an axial location of said pivot substantially coincides with an axial location of said elastic center; a second drive component interconnected to said coupling; and a drive unit interconnected to, and driven by, said second drive component.

The coupling advantageously provides significantly increased radial stiffness as compared to certain prior art couplings.

Further, the coupling advantageously provides such increased radial stiffness without appreciably affecting cocking stiffnesses, therefore, the propensity for driveline vibration is reduced.

Moreover, the coupling advantageously provides high torque carrying capacity while exhibiting a torque limitation feature.

The above-mentioned and further features, advantages, and characteristics of the present invention will become apparent from the accompanying descriptions of the preferred embodiments and attached drawings.

BRIEF DESCRIPTION OF THE DRAWINGS

The invention will become better understood by reference to the description that follows, in conjunction with the appended drawings, in which.

DETAILED DESCRIPTION OF THE PREFERRED EMBODIMENT

Figure 1:
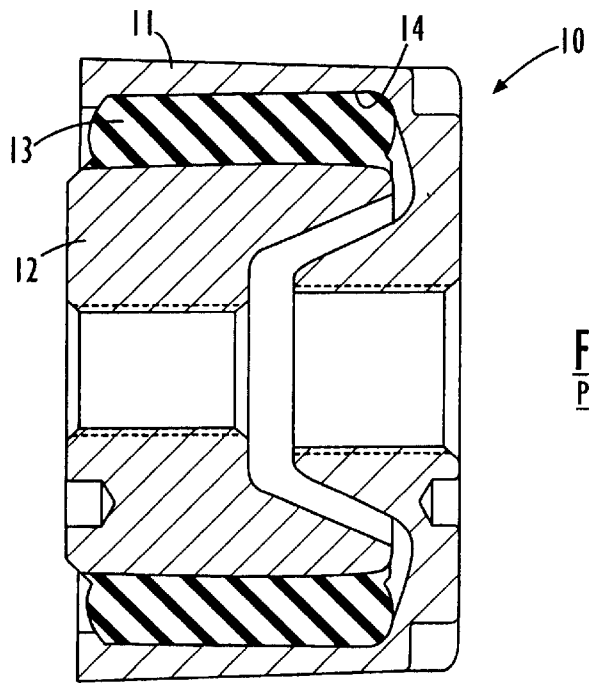
FIG. 1 s a cross-sectioned side view of a flexible coupling according to the Prior Art.
Figure 2:
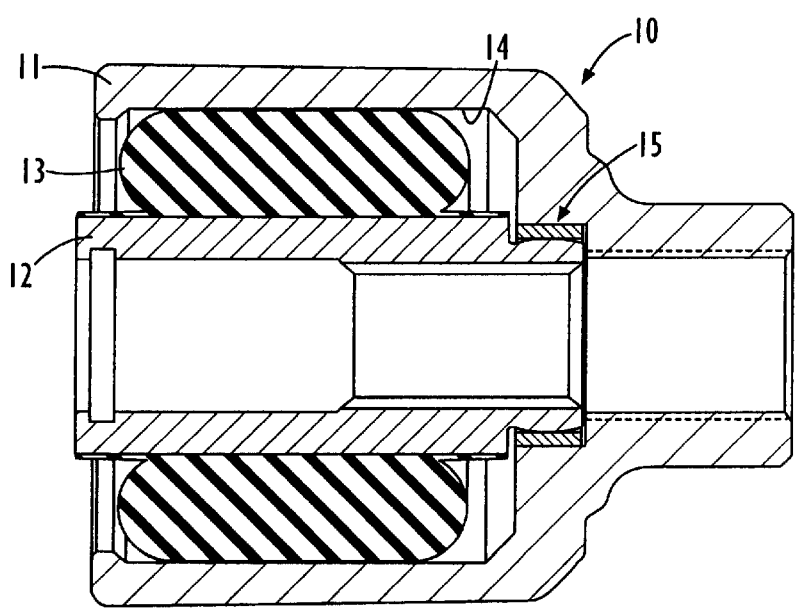
FIG. 2 is a cross-sectioned side view of another flexible coupling according to the Prior Art.
Figure 3:
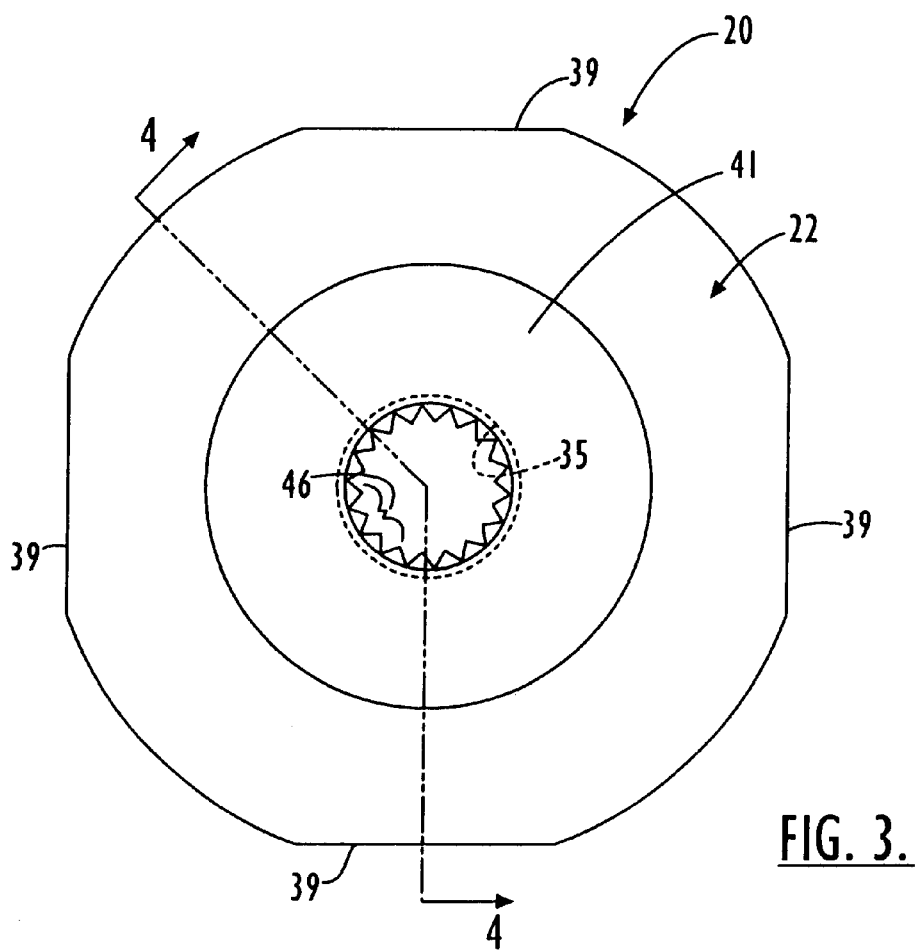
FIG. 3 is an end view of the flexible coupling in accordance with the present invention.
Figure 4:
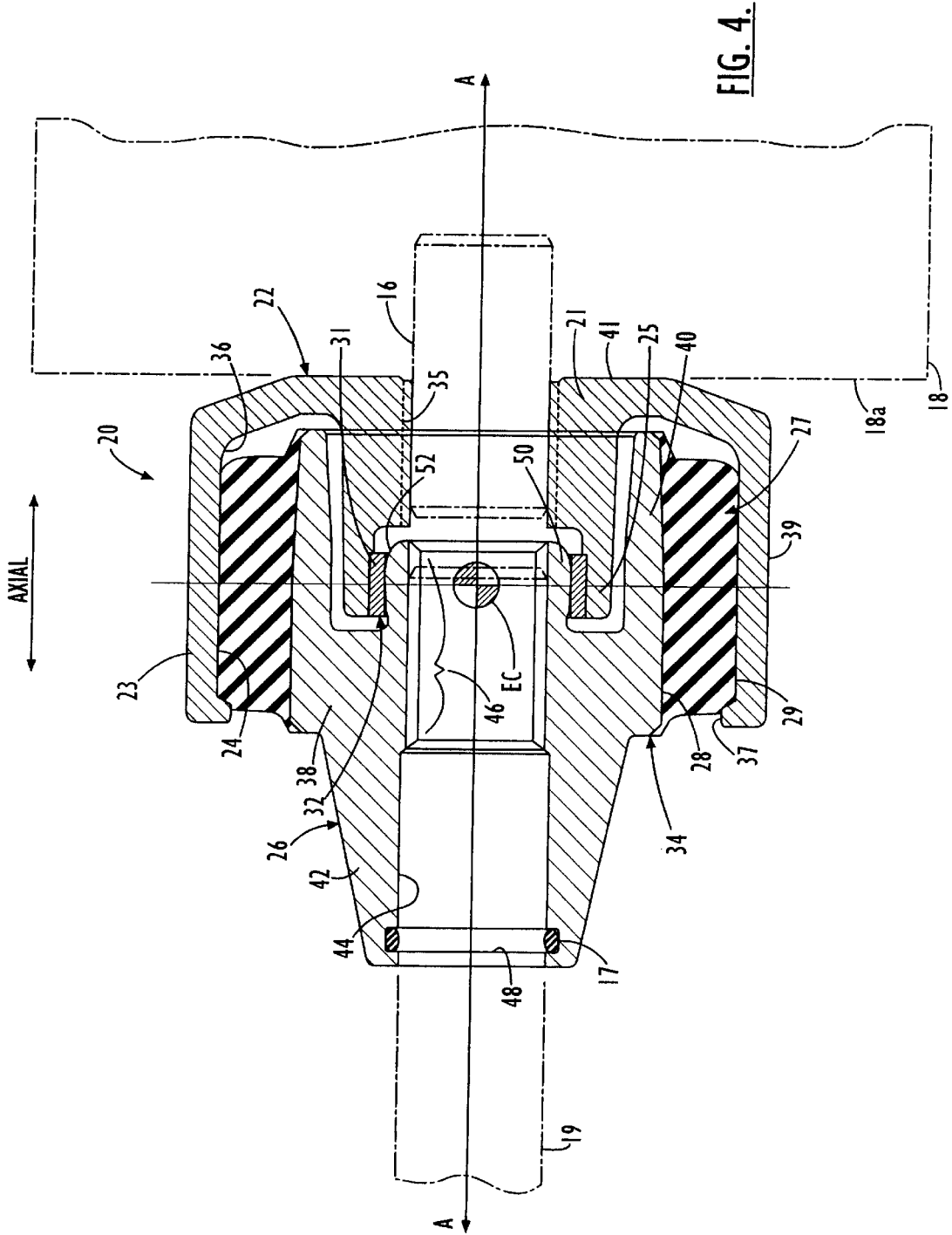
FIG. 4 is a cross-sectioned side view of the coupling of FIG. 3 taken along line 4—4.

A flexible elastomeric coupling 20 according to the invention is first illustrated in FIGS. 3 and 4. This coupling 20 provides a soft torsional stiffness in a drive train between a clutch, flywheel or other like driving component 18 and an output shaft or other like driven component 19. By way of example, and not to be considered limiting, the coupling 20 described herein includes a torsional stiffness of about 4,500 lbf.-in./radian (508 N-m/radian), a radial stiffness of about 256,200 lbf./in. (44,835 N/mm) and a cocking stiffness of about 14,400 lbf.-in./radian (1,627 N-n/radian). And, in particular, it should be recognized that the present coupling 20 includes a radial stiffness of greater than 100,000 lbf./in. and yet exhibits a cocking spring rate of less than 100,000 lbf.in./radian, a feat not possible in either of the FIG. 1 or FIG. 2 prior art couplings.

Figure 5:
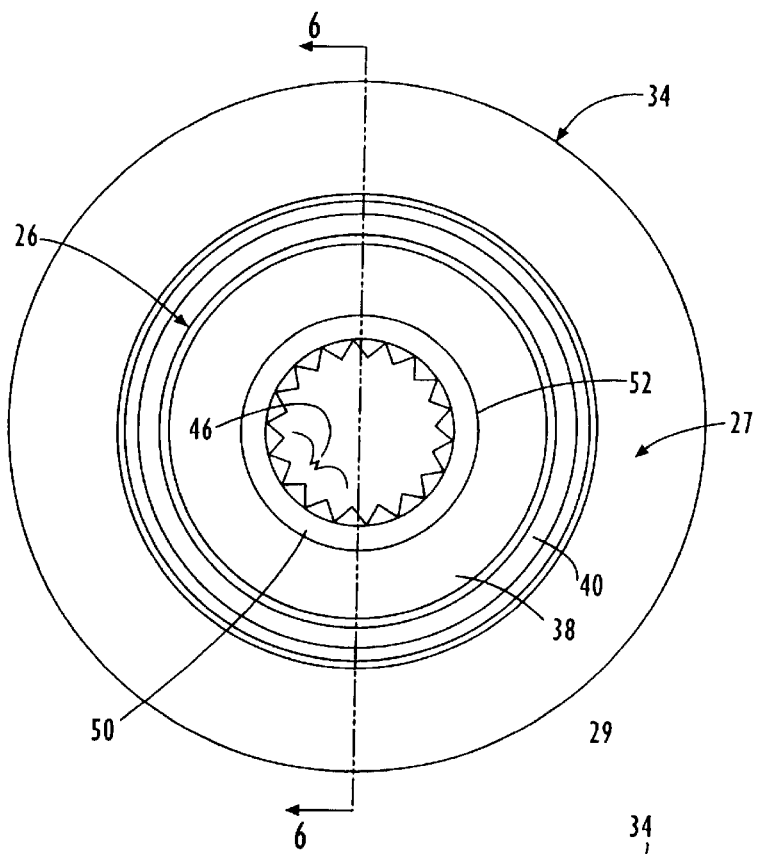
FIG. 5 is an end view of the bonded subassembly in accordance with the present invention.
Figure 6:
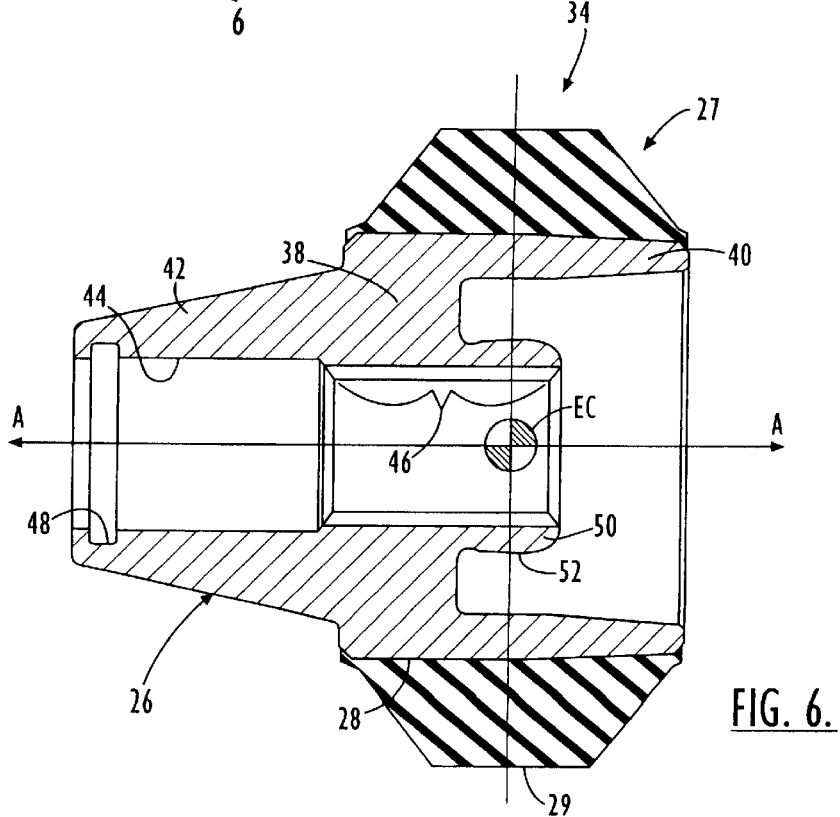
FIG. 6 is a cross-sectioned side view of the bonded subassembly of FIG. 5 taken along line 6—6.
Figure 7:
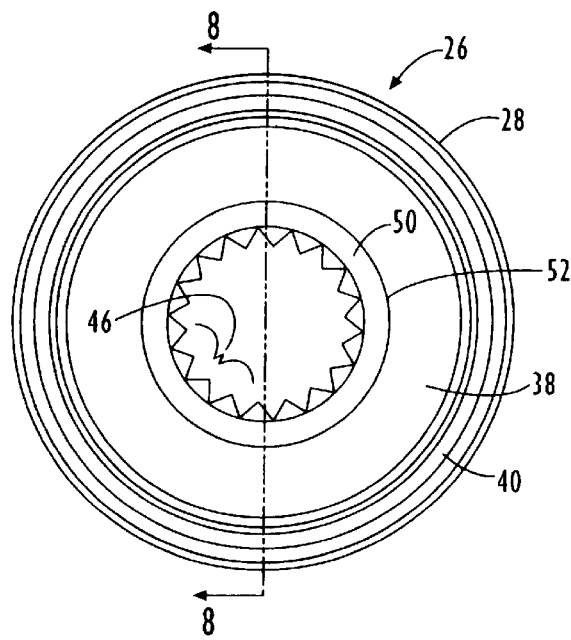
FIG. 7 is an end view of the inner member.
Figure 8:
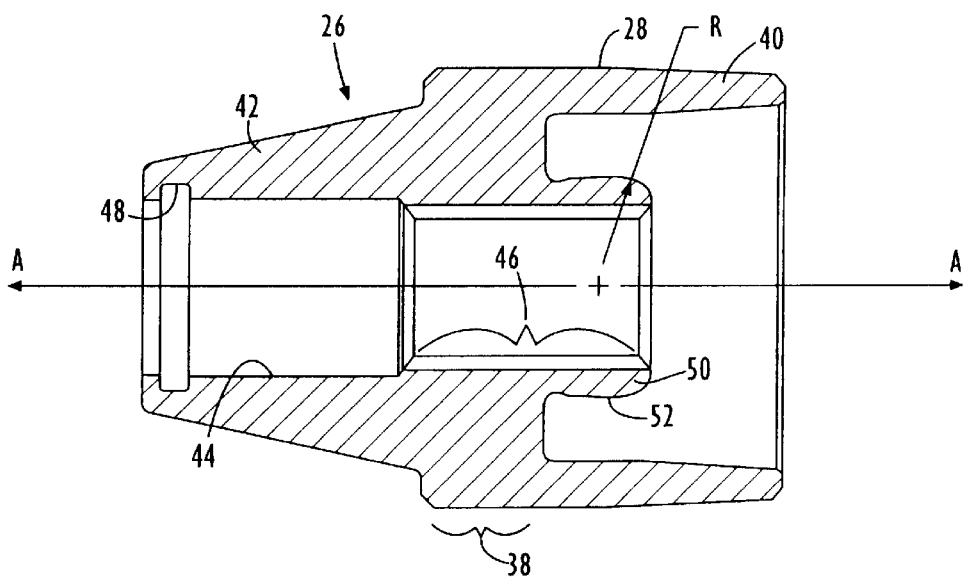
FIG. 8 is a cross-sectioned side view of the inner member of FIG. 7 taken along line 8—8.
Figure 9:
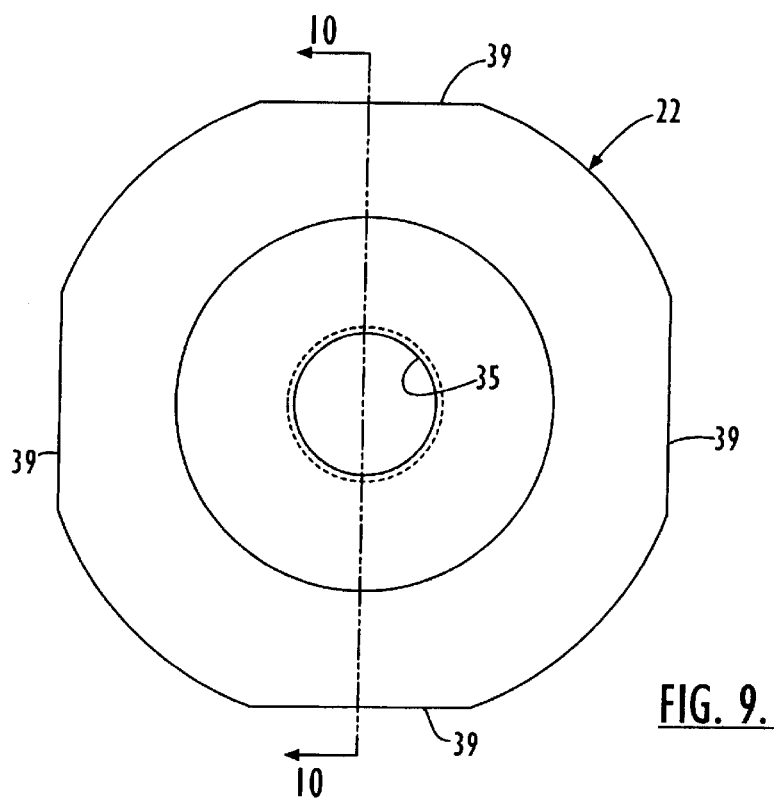
FIG. 9 is an end view of the outer member.
Figure 10:
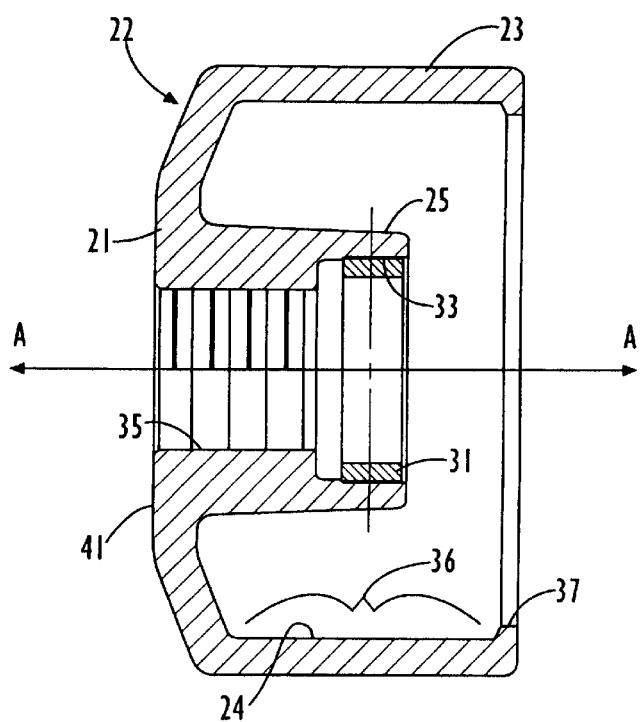
FIG. 10 is a cross-sectioned side view of the outer member of FIG. 9 taken along line 10—10.

According to the invention, the coupling 20 includes a driving member 22, a driven member 26 spaced therefrom and a flexible member 27 intervening between them. Flexible member 27 preferably comprises a polymeric material, such as a flexible plastic or elastomer, and is preferably bonded to the generally cylindrical outer surface 28 of the driven member 26. In its unassembled form, as best shown in FIG. 5 and 6, the flexible member 27 comprises an annulus of generally trapezoidal cross section. The most preferred flexible member 27 is a natural rubber elastomer exhibiting a hardness of between about 35 and 70 shore A and is bonded to the outer surface 28 of driven member 26 by conventional means, such as hot vulcanized bonding or cold bonding.

Now referring to FIGS. 3–6, the coupling's driven member 26 with the flexible member 27 bonded thereto comprises a bonded sub-assembly 34. The bonded subassembly 34 is interference fit (precompressed) into a pocket 36 formed in the driving member 22. The bonded subassembly 34 is inserted and driven into a funnel via considerable axial force thereby inserting subassembly 34 into the driving member 22 and, resultantly, precompressing the flexible member 17 in the range between about 15% and 35% radial precompression strain, and more preferably about 25%. This ensures significant frictional engagement between the outer surface 29 of the flexible member 27 and the inner surface 24 of the driving member 22. Together, the subassembly 34 and the driving member 22 comprise the coupling 20.

It should be recognized that the flexible member 27 is bonded to the driven member 26 and unbonded to the driving member 22. Therefore, as the limit torque about the central axis A—A is exceeded, the surface 29 of flexible member 27 will slip relative to the inner surface 24 of driven member 26, thereby providing an overload prevention feature to be described more thoroughly with reference to FIG. 11.

Figure 12:
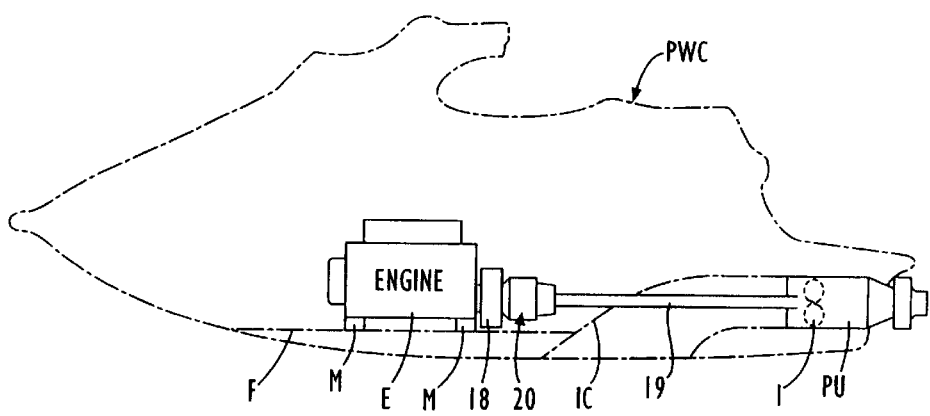
FIG. 12 is a personal watercraft vehicle in which the coupling according to the present invention finds excellent utility.

As best shown in FIGS. 4–8, the driven member 26 includes a main body portion 38 having a first generally cylindrical projecting portion 40 extending axially therefrom in a first direction along the central axis A—A and a tapered projection 42 extending generally axially in the opposite direction from the body portion 38. The driven member 26 also includes a circular bore 44 formed therethrough including a splined portion 46 for receiving the splined output shaft 19 (FIG. 3). Preferably, the driven member 26 is manufactured from an aluminum or brass material. The drive component output shaft 19 connects between the coupling 20 and the drive unit, such as the propulsion unit of a personal watercraft as shown in FIG. 12. An o-ring groove 48 is formed in the tapered projection 42 for receiving the o-ring 17 (FIG. 3). An elastomer o-ring 17 (FIG. 4) is received in the groove 48 and prevents escape of any grease used to lubricate the splined section 46 and minimized debris exposure to the inner workings of the coupling 20. The driven member 26 also includes a second projecting portion 50 spaced radially inward from, and concentric with, the first projecting portion 40. The second projecting portion 50 includes a generally annular shape and includes a bearing member such as an arcuate surface 52 formed on a radially outer periphery thereof. Preferably, the surface 52 includes a generally spherical profile formed thereon of radius R.

In FIGS. 3, 4 9 and 10, the driving member 22 is shown. The driving member 22 includes a radial bridging portion 21, a generally cylindrical outer projection 23 extending substantially axially along axis A—A from the bridging portion 21, and a generally annular inner projection 25 extending in a substantially axial direction from the bridging portion 21. The outer projection 23 and inner projection 25 are generally concentric. A threaded bore 35 extends axially through the bridging portion 21 and a portion of the inner projection 25. The driving member 22 is preferably manufactured from aluminum material.

An annular low-friction bushing 31 is received in a press fit relation in a slightly smaller bore 33 formed in an axial end of the inner projection 25. The bushing 31 acts as a bearing member (it bears radial load) and is preferably manufactured from a steel band including an inner annular portion of Teflon® impregnated porous bronze. Lip 37 formed at the end of outer projection 23, together with the inner surface 24 and bridging portion 21, form a pocket 36 into which the flexible member 27 (FIGS. 4 and 6) is received. Wrench flats 39 are formed on the outer surface of the driving member 22 such that the coupling 20 may be torqued onto, and securely fastened, to the threaded stud 16 formed integral with the flywheel 18 (FIGS. 4, 12). This installation brings the frontal planar surface 41 of the driving member 22 securely into mating contact with the aft surface portion 18a of the flywheel 18.

As best shown in FIGS. 4, the coupling 20 includes a rotational pivot 32. The pivot 32 is formed by the interaction of a bearing member, such as the non-planar arcuate surface, on the second projecting portion 50 of the driven member 26 with a bearing member, such as the bushing 31, formed on the inner projection 25 of the driving member 22. The pivot 32 facilitates cocking and axial motion but substantially restrains radial motion between the members 22, 26.

In the present invention, the axial location of the pivot 32 is substantially aligned with the axial location of the Elastic Center (EC) of the flexible member 27. The Elastic Center (EC) is generally defined as the point in space positioned axially relative to the flexible member 27 where, if one member of the coupling 20, for example, the driving member 22 is held stationary, and a radially-directed load is applied to the other member (the driven member 26) and through that point, there will be zero rotation of the loaded member, i.e., the driven member 26. It should be understood that this assumes that the loading is applied with the driveline components disconnected. Orienting the elastic center EC substantially coincident with the axial location of the pivot 32 has the concomitant effect of maximizing the cocking misalignment that may be accommodated between the driving 22 and driven 26 members. Further, any radial loading applied passes directly through the elastic center of the flexible member 17 thereby minimizing cocking rotation thereof. Moreover, such location minimized the cocking stiffness of the coupling thereby minimizing vibration transmitted to the driveline components. The pivot 32 allows cocking rotation between the members 22, 26 by way of rotation of the arcuate surface 52 relative to the bushing 31. In addition, the pivot limits radial movement between the members 22, 26 and increases the radial stiffness dramatically.

Figure 11:
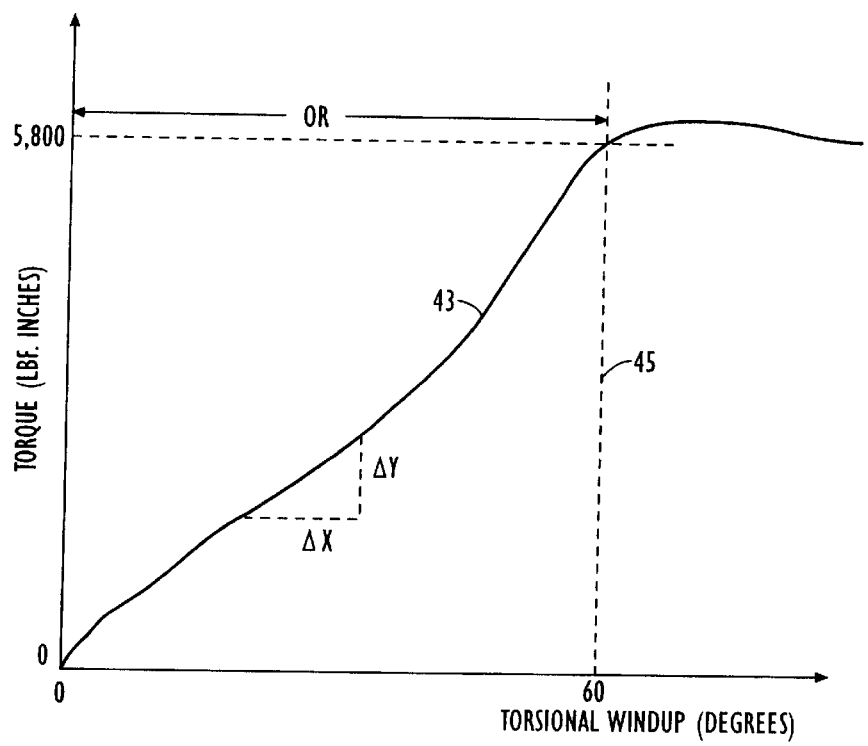
FIG. 11 is a representative torsional spring rate curve of the coupling in accordance with the present invention.

FIG. 11 illustrates a representative spring rate curve 43 where Torque (in lbf.inches) is plotted against Torsional Windup (in degrees) between the driving 22 and driven 26 members of the coupling 20. The spring rate ΔY/ΔX is fairly linear within its operating range OR. Upon exceeding the limit torque (beyond the dotted line 45), the bonded subassembly 34 rotationally slips within the driving member 22 and addition angular deflection occurs without any significant increase in the torque. This protects driveline components from being over-torqued and over-stressed. By way of example, one embodiment of the invention will slip at 5,800 lbf.-inches of torque or greater at about 60 degrees or more.

Shown in FIG. 12 is a vehicle, such as a personal watercraft PWC, in which the coupling 20 of the present invention finds utility. The coupling 20 interconnects between the first and second drive components, i.e., a flywheel 18 and the output shaft 19. The engine E is mounted to the hull liner or other frame structure F by a plurality of elastomer engine mounts M. Upon being started, the engine E rotates the flywheel 18 mounted thereto which, in turn, rotates the coupling 20. The driven member 26 (FIG. 4) of the coupling 20 is connected to the shaft 19 and rotates therewith to rotate the pump components, for example the impeller I, in the propulsion drive unit PU thereby drawing water into the channel IC and propelling the vehicle, i.e., the personal watercraft PWC.

The coupling 20, via its relatively high radial stiffness (greater than about 100,000 lbf./in. (17,510 N/mm)), exhibits excellent concentricity between the driving and driven components and helps to maintain the concentricity between the shaft 19 and flywheel 18, thereby minimizing rotational unbalances transmitted into the mounts M and thereby into frame F. Further, the relatively low cocking stiffness of the coupling 20 (about 14,400 lbf.-in./rad. (1,627 N-m/radian)) minimizes forces transmitted into the mounts M and frame F as a result of any cocking misalignment between the flywheel 18 and shaft 19. Accordingly, the coupling 20 of the present invention facilitates smooth operation of the driveline components of the personal watercraft PWC. Notably, the coupling according to the invention may find utility in other vehicles, such as ATV's, boats, motorcycles, etc.

The invention has been described in terms of preferred structure, however, the particular example given is meant to be illustrative and not limiting. For example, the driving and driven members can take alternate forms or their orientations may be reversed. Moreover, the pivot may be of other forms. Substitutions and equivalents as will occur to those skilled in the art are included within the scope of the invention as defined by the following claims.

What is claimed is:

1. A coupling, comprising:
   a) a driving member including an inner surface and radially spaced inner and outer projections;
   b) a driven member including an outer surface;
   c) a flexible member intervening between said outer surface and said inner surface, said flexible member including an elastic center; and
   d) a pivot cooperating between said driving and said driven members wherein an axial location of said pivot substantially coincides with an axial location of said elastic center.

2. The coupling of claim 1 wherein said inner and outer projections comprise hollow generally concentric and generally cylindrical portions which extend in an axial direction along a central axis.

3. The coupling of claim 1 wherein said outer projection includes an inner surface, a lip formed at an end portion of said outer projection, and wherein said outer projection extends from a bridging portion interconnecting said inner and outer projections, said inner surface, said lip and said bridging portion cooperating to form a pocket which receives said flexible member.

4. The coupling of claim 1 wherein said inner projection receives a cylindrical bushing in a bore formed therein.

5. The coupling of claim 1 wherein said driven member further comprises radially-spaced first and second projecting portions.

6. The coupling of claim 5 wherein said first and second projecting portions extend in an axial direction along a central axis.

7. The coupling of claim 6 wherein said first projecting portion further comprises a hollow generally cylindrical shape.

8. The coupling of claim 6 wherein said second projecting portion further comprises an arcuate surface formed on a radially outward surface thereof.

9. The coupling of claim 7 further comprising a tapered projection which projects in a axial direction from a main body portion in a direction opposite from said projecting portions.

10. The coupling of claim 1 wherein said flexible member further comprises a trapezoidal cross section in a preassembled condition.

11. The coupling of claim 1 wherein said flexible member is radially precompressed between an inner surface of said driving member and an outer surface of said driven member in an assembled condition.

12. The coupling of claim 11 wherein said flexible member is precompressed by between about 15% and 35% of a radial thickness in a preassembled condition.

13. The coupling of claim 1 wherein said flexible member is unbonded to said driving member and bonded to said driven member.

14. The coupling of claim 1 wherein said pivot further comprises a bushing formed on said driving member which engages an arcuate surface formed on said driven member.

15. The coupling of claim 1 wherein said driving member comprises radially-spaced inner and outer projections and said driven member comprises radially-spaced first and second projecting portions and wherein said pivot is formed between said inner projection and said second projecting portion.

16. The coupling of claim 15 wherein said pivot comprises a bushing formed on said inner projection and a non-planar surface formed on said second projecting portion.

17. The coupling of claim 15 wherein said bushing includes an annulus of low friction material and said non-planar surface includes a arcuate surface.

18. The coupling of claim 1 wherein said driven member and said flexible member comprise a bonded subassembly, said subassembly comprising:
   the driven member including first and second projecting portions extending in an axial direction from a main body portion, said first projecting portion including an outer surface formed thereon, said second projecting portion including a bearing member of said pivot formed on a radially outward surface thereof,
   the flexible member bonded to said outer surface, said flexible member includes an elastic center, and
   a third projection which projects in a axial direction from a main body portion in a direction opposite from said projecting portions, wherein and an axial location of said bearing member is substantially aligned with said elastic center.

19. The coupling of claim 1 further comprising a radial stiffness which is greater than about 100,000 lbf.-in./rad. and a cocking stiffness which is less than about 100,000 lbf.-in./rad.

20. A vehicle including the coupling as claimed in claim 1, said vehicle comprising:
   a) a structure;
   b) an engine mounted to said structure;
   c) a first drive component interconnected to and rotated by said engine;
   d) a second drive component interconnected to said coupling; and
   e) a drive unit interconnected to, and driven by, said second drive component.

21. A coupling, comprising:
   a) a driving member including a bridging portion, an outer projection axially extending from said bridging portion, and an inner projection axially extending from said bridging portion and spaced radially inward from said outer projection, said outer projection including an inner surface and said inner projection including a first bearing member,
   b) a driven member including a main body portion including first and second projecting portions projecting axially therefrom, an outer surface formed on said first projecting portion and a second bearing member formed on said second projecting portion,
   c) a flexible member bonded to said outer surface of said driven member and received in a radially precompressed and unbonded relation with said inner surface, said flexible member including an elastic center, and
   d) a pivot formed by said first and second bearing members, wherein an axial location of said pivot substantially coincides with said elastic center.

22. A coupling, comprising:
   a) a first member including a generally hollow cylindrical outer projection having an inner surface, and an generally cylindrical inner projection concentric with said outer projection, said inner projection including a first bearing member,
   b) a second member including a generally cylindrical first projecting portion and a second projecting portion generally concentric with said first projecting portion, said first projecting portion including an outer surface and said second projecting portion including a second bearing member, c) an annular flexible member bonded to said outer surface and received in a radially precompressed and unbonded relation with said inner surface, said flexible member including an elastic center, and d) a pivot formed by said first and second bearing members, and wherein axial location of said pivot substantially coincides with an axial position of said elastic center.

23. A bonded subassembly adapted to be received in a driving member of a coupling, said bonded subassembly comprising:

a driven member including first and second projecting portions extending in an axial direction from a main body portion, said first projecting portion including an outer surface formed thereon, said second projecting portion including a bearing member formed on a radially outward surface thereof, a flexible member bonded to said outer surface, said flexible member including an elastic center, a third projection which projects in a axial direction from a main body portion in a direction opposite from said projecting portions, and an axial location of said bearing member is substantially axially aligned with an axial position of said elastic center.

* * * * *